United States Patent
Yang

(10) Patent No.: US 11,157,624 B2
(45) Date of Patent: Oct. 26, 2021

(54) SCHEME OF USING ELECTRONIC DEVICE TO ACTIVATE MASS PRODUCTION SOFTWARE TOOL TO INITIALIZE MEMORY DEVICE INCLUDING FLASH MEMORY CONTROLLER AND FLASH MEMORY

(71) Applicant: Silicon Motion Inc., Hsinchu County (TW)

(72) Inventor: Shang-Ta Yang, Taoyuan (TW)

(73) Assignee: Silicon Motion, Inc., Hsinchu County (TW)

( * ) Notice: Subject to any disclaimer, the term of this patent is extended or adjusted under 35 U.S.C. 154(b) by 126 days.

(21) Appl. No.: 16/541,117

(22) Filed: Aug. 14, 2019

(65) Prior Publication Data

US 2021/0049278 A1    Feb. 18, 2021

(51) Int. Cl.
| | | |
|---|---|---|
| *G06F 21/57* | (2013.01) | |
| *G06F 9/445* | (2018.01) | |
| *G06F 8/65* | (2018.01) | |
| *G06F 21/60* | (2013.01) | |

(52) U.S. Cl.
CPC .............. *G06F 21/572* (2013.01); *G06F 8/65* (2013.01); *G06F 9/44505* (2013.01); *G06F 21/602* (2013.01)

(58) Field of Classification Search
CPC ......... G06F 21/572; G06F 21/602; G06F 8/65
See application file for complete search history.

(56) References Cited

U.S. PATENT DOCUMENTS

| | | | | |
|---|---|---|---|---|
| 7,272,500 B1 * | 9/2007 | Walker | .................... | G06Q 40/04 701/486 |
| 2010/0070693 A1 * | 3/2010 | Conley | .................... | G06F 9/445 711/103 |
| 2010/0275073 A1 * | 10/2010 | Lasser | .................... | G11C 29/26 714/718 |
| 2013/0247229 A1 * | 9/2013 | Asipov | ............... | G06F 21/6218 726/30 |
| 2013/0346671 A1 * | 12/2013 | Michael | ............... | G06F 3/0679 711/103 |
| 2014/0351585 A1 * | 11/2014 | Hayashi | .................. | H04L 63/06 713/164 |

(Continued)

FOREIGN PATENT DOCUMENTS

| | | |
|---|---|---|
| JP | 2004-30518 | 1/2004 |
| JP | 2016-139305 A | 8/2016 |

(Continued)

*Primary Examiner* — Vincent H Tran
(74) *Attorney, Agent, or Firm* — Winston Hsu

(57) ABSTRACT

A method for using an electronic device to activate amass production software tool to initialize a memory device including a flash memory controller and a flash memory includes: using the mass production software tool to retrieve an encrypted configuration file included by the mass production software tool; decrypting the encrypted configuration file to generate a temporarily decrypted configuration file; comparing unique information of the electronic device with unique information recorded in the temporarily decrypted configuration file to determine whether the electronic device is valid/authorized; and performing a flash memory initialization operation upon the flash memory when the electronic device is valid/authorized.

6 Claims, 4 Drawing Sheets

(56) References Cited

U.S. PATENT DOCUMENTS

| | | | | |
|---|---|---|---|---|
| 2016/0063225 | A1* | 3/2016 | Asipov | G06F 21/12 726/30 |
| 2018/0329649 | A1* | 11/2018 | Chien | G06F 3/0679 |
| 2019/0065770 | A1* | 2/2019 | Poe | G06F 21/6218 |
| 2019/0346821 | A1* | 11/2019 | Case | G06F 21/12 |
| 2019/0347383 | A1* | 11/2019 | Lai | G06F 21/105 |
| 2020/0218466 | A1* | 7/2020 | Han | G06F 3/0659 |

FOREIGN PATENT DOCUMENTS

| | | |
|---|---|---|
| TW | I448967 B | 8/2014 |
| TW | I627554 B | 6/2018 |

* cited by examiner

SCHEME OF USING ELECTRONIC DEVICE TO ACTIVATE MASS PRODUCTION SOFTWARE TOOL TO INITIALIZE MEMORY DEVICE INCLUDING FLASH MEMORY CONTROLLER AND FLASH MEMORY

BACKGROUND OF THE INVENTION

1. Field of the Invention

The invention relates to a flash memory initialization validation scheme, and more particularly to a scheme capable of avoiding other persons applying a flash memory mass production software tool in different operations/devices.

2. Description of the Prior Art

Generally speaking, a flash memory manufacturer can easily get or obtain a mass production software tool provided by a flash memory controller provider. The flash memory manufacturer may use the mass production software tool to perform various kinds of flash memory tests but does not use the controller provided by the flash memory controller provider. It is difficult for the controller provider to sell its controller products. Thus, it is important to provide a novel protection solution to bind the mass production software tool with authorized/valid devices of the manufacturer and a validation process to check whether an electronic device (e.g. a computer) is authorized.

SUMMARY OF THE INVENTION

Therefore one of the objectives of the invention is to provide methods for using an electronic device to activate a mass production software tool to initialize a memory device including a flash memory controller and a flash memory, electronic devices, and corresponding computer readable mediums, to solve the above mentioned problems.

According to embodiments of the invention, a method for using an electronic device to activate a mass production software tool to initialize a memory device including a flash memory controller and a flash memory is disclosed. The memory device is to be coupled to the electronic device via a USB interface, and the method comprises: using the mass production software tool to retrieve an encrypted configuration file included by the mass production software tool; decrypting the encrypted configuration file to generate a temporarily decrypted configuration file; retrieving build date information from the temporarily decrypted configuration file; comparing time information included within the build date information with a specific time information to determine whether the build date information is out of date; comparing unique information of the electronic device with unique information recorded in the temporarily decrypted configuration file to determine whether the electronic device is valid/authorized when the build date information is not out of date; and performing a flash memory initialization operation upon the flash memory when the electronic device is valid/authorized, the flash memory initialization operation comprising using the mass production software tool to control the flash memory controller via the USB interface to: clear at least one system block of the flash memory; perform a pretest operation upon to scan all blocks of the flash memory; establish at least one information table based on a result of the pretest operation; download a firmware included by the mass production software tool from the electronic device to the flash memory via the USB interface and the flash memory controller; and perform a format operation upon data blocks of the flash memory.

According to the embodiments, a method for using an electronic device to activate a mass production software tool to initialize a memory device including a flash memory controller and a flash memory is disclosed. The memory device is to be coupled to the electronic device via a USB interface, and the method comprises: using the mass production software tool to retrieve an encrypted configuration file included by the mass production software tool; decrypting the encrypted configuration file to generate a temporarily decrypted configuration file; comparing unique information of the electronic device with unique information recorded in the temporarily decrypted configuration file to determine whether the electronic device is valid/authorized; and performing a flash memory initialization operation upon the flash memory when the electronic device is valid/authorized, the flash memory initialization operation comprising using the mass production software tool to control the flash memory controller via the USB interface to: clear at least one system block of the flash memory; perform a pretest operation upon to scan all blocks of the flash memory; establish at least one information table based on a result of the pretest operation; download a firmware included by the mass production software tool from the electronic device to the flash memory via the USB interface and the flash memory controller; and perform a format operation upon data blocks of the flash memory.

According to the embodiments, an electronic device for activate a mass production software tool to initialize a memory device including a flash memory controller and a flash memory is disclosed. The memory device is to be coupled to the electronic device via a USB interface, and the electronic device comprises a memory for storing the mass production software tool and a processing unit coupled to the memory. The processing unit is arranged for: using the mass production software tool to retrieve an encrypted configuration file included by the mass production software tool; decrypting the encrypted configuration file to generate a temporarily decrypted configuration file; comparing unique information of the electronic device with unique information recorded in the temporarily decrypted configuration file to determine whether the electronic device is valid/authorized; and performing a flash memory initialization operation upon the flash memory when the electronic device is valid/authorized, the flash memory initialization operation comprising using the mass production software tool to control the flash memory controller via the USB interface to: clear at least one system block of the flash memory; perform a pretest operation upon to scan all blocks of the flash memory; establish at least one information table based on a result of the pretest operation; download a firmware included by the mass production software tool from the electronic device to the flash memory via the USB interface and the flash memory controller; and perform a format operation upon data blocks of the flash memory.

According to the embodiments, an electronic device for activate a mass production software tool to initialize a memory device including a flash memory controller and a flash memory is disclosed. The memory device is to be coupled to the electronic device via a USB interface. The electronic device comprises a memory for storing the mass production software tool and a processing unit coupled to the memory. The processing unit is arranged for: using the mass production software tool to retrieve an encrypted configuration file included by the mass production software tool; decrypting the encrypted configuration file to generate a temporarily decrypted configuration file; retrieving build date information from the temporarily decrypted configuration file; comparing time information included within the build date information with a specific time information to determine whether the build date information is out of date; comparing unique information of the electronic device with unique information recorded in the temporarily decrypted configuration file to determine whether the electronic device is valid/authorized when the build date information is not out of date; and performing a flash memory initialization operation upon the flash memory when the electronic device is valid/authorized, the flash memory initialization operation comprising using the mass production software tool to control the flash memory controller via the USB interface to: clear at least one system block of the flash memory; perform a pretest operation upon to scan all blocks of the flash memory; establish at least one information table based on a result of the pretest operation; download a firmware included by the mass production software tool from the electronic device to the flash memory via the USB interface and the flash memory controller; and perform a format operation upon data blocks of the flash memory.

According to the embodiments, a computer-readable medium is disclosed. The computer-readable medium having computer-executable instructions stored thereon which, when executed by a computer for activate a mass production software tool to initialize a memory device including a flash memory controller and a flash memory wherein the memory device is to be coupled to the electronic device via a USB interface, will cause the computer to: using the mass production software tool to retrieve an encrypted configuration file included by the mass production software tool; decrypting the encrypted configuration file to generate a temporarily decrypted configuration file; comparing unique information of the electronic device with unique information recorded in the temporarily decrypted configuration file to determine whether the electronic device is valid/authorized; and performing a flash memory initialization operation upon the flash memory when the electronic device is valid/authorized, the flash memory initialization operation comprising using the mass production software tool to control the flash memory controller via the USB interface to: clear at least one system block of the flash memory; perform a pretest operation upon to scan all blocks of the flash memory; establish at least one information table based on a result of the pretest operation; download a firmware included by the mass production software tool from the electronic device to the flash memory via the USB interface and the flash memory controller; and perform a format operation upon data blocks of the flash memory.

According to the embodiments, a computer-readable medium is disclosed. The computer-readable medium having computer-executable instructions stored thereon which, when executed by a computer for activate a mass production software tool to initialize a memory device including a flash memory controller and a flash memory wherein the memory device is to be coupled to the electronic device via a USB interface, will cause the computer to: using the mass production software tool to retrieve an encrypted configuration file included by the mass production software tool; decrypting the encrypted configuration file to generate a temporarily decrypted configuration file; retrieving build date information from the temporarily decrypted configuration file; comparing time information included within the build date information with a specific time information to determine whether the build date information is out of date; comparing unique information of the electronic device with unique information recorded in the temporarily decrypted configuration file to determine whether the electronic device is valid/authorized when the build date information is not out of date; and performing a flash memory initialization operation upon the flash memory when the electronic device is valid/authorized, the flash memory initialization operation comprising using the mass production software tool to control the flash memory controller via the USB interface to: clear at least one system block of the flash memory; perform a pretest operation upon to scan all blocks of the flash memory; establish at least one information table based on a result of the pretest operation; download a firmware included by the mass production software tool from the electronic device to the flash memory via the USB interface and the flash memory controller; and perform a format operation upon data blocks of the flash memory.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
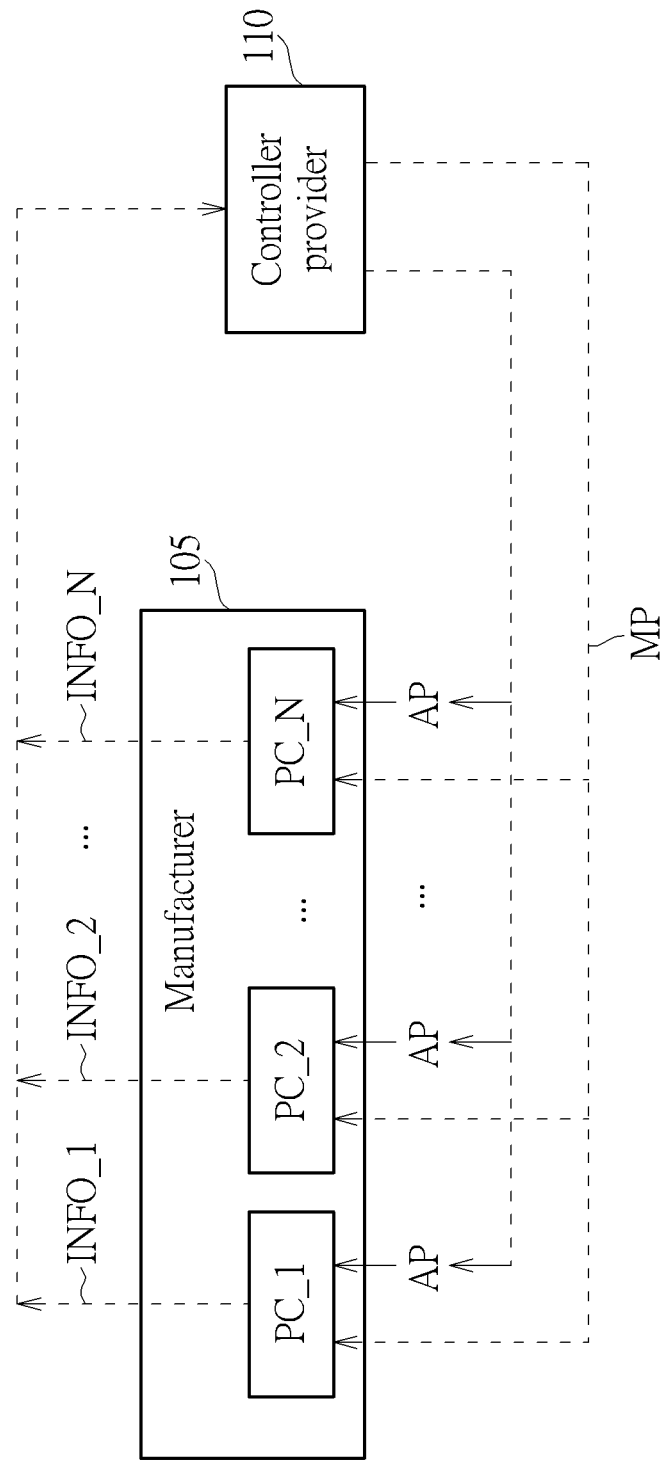
FIG. 1 is an overview system diagram showing a relation between multiple flash memory initialization devices PC_1~PC_N of a flash memory manufacturer and a flash memory controller provider which is arranged to provide a mass production software tool MP for the flash memory manufacturer according to an embodiment of the invention.

FIG. 1 is an overview system diagram showing a relation between multiple flash memory initialization devices PC_1~PC_N of a flash memory manufacturer 105 and a flash memory controller provider 110 which is arranged to provide a mass production software tool MP for the flash memory manufacturer 105 according to an embodiment of the invention.

As shown in FIG. 1, the flash memory initialization devices PC_1~PC_N such as personal computers are respectively used by the flash memory manufacturer 105 in a factory to initialize memory devices each including a flash memory controller and a flash memory. To successfully initialize memory devices, each flash memory initialization device of the flash memory manufacturer 105 needs to get authorization of the mass production software tool MP provided from the flash memory controller provider 110.

For example, the flash memory controller provider 110 authorizes N electronic devices of the manufacturer 105 as valid flash memory initialization devices and provides a small application software tool AP for the flash memory manufacturer 105 wherein the small application software tool AP is arranged to collect and generate corresponding unique information of each electronic device which executes such tool AP. Then, the flash memory controller provider 110 is arranged to ask the flash memory manufacturer 105 to return the corresponding unique information of all the authorized/valid electronic devices back to the flash memory controller provider 110. In this example, the flash memory controller provider 110 may receive the corresponding unique information INFO_1~INFO_N of the N electronic devices PC_1-PC_N, and then is arranged to encrypt or encode the corresponding unique information INFO_1~INFO_N of the N electronic devices PC_1~PC_N to generate an encrypted/encoded configuration file which is to be packaged in the mass production software tool MP. In addition, for each of the corresponding unique information INFO_1~INFO_N, the flash memory controller provider 110 generates a build date so as to finally generate build date information of corresponding unique information INFO_1~INFO_N. The smallest record unit of one build date may be hours (but not limited), and different electronic devices PC_1~PC_N may record partially identical/different date information. The flash memory controller provider 110 then provides the mass production software tool MP including the encrypted/encoded configuration file for the flash memory manufacturer 105. The encrypted/encoded configuration file cannot be easily cracked by the flash memory manufacturer 105 or other persons, and is used to verify whether an electronic device is used as a valid flash memory initialization device for initializing a memory device including a flash memory controller and a flash memory. After receiving the mass production software tool MP from the flash memory controller provider 110, the flash memory manufacturer 105 is arranged to active and execute the mass production software tool MP on its initialization devices to initialize memory devices.

Figure 2:
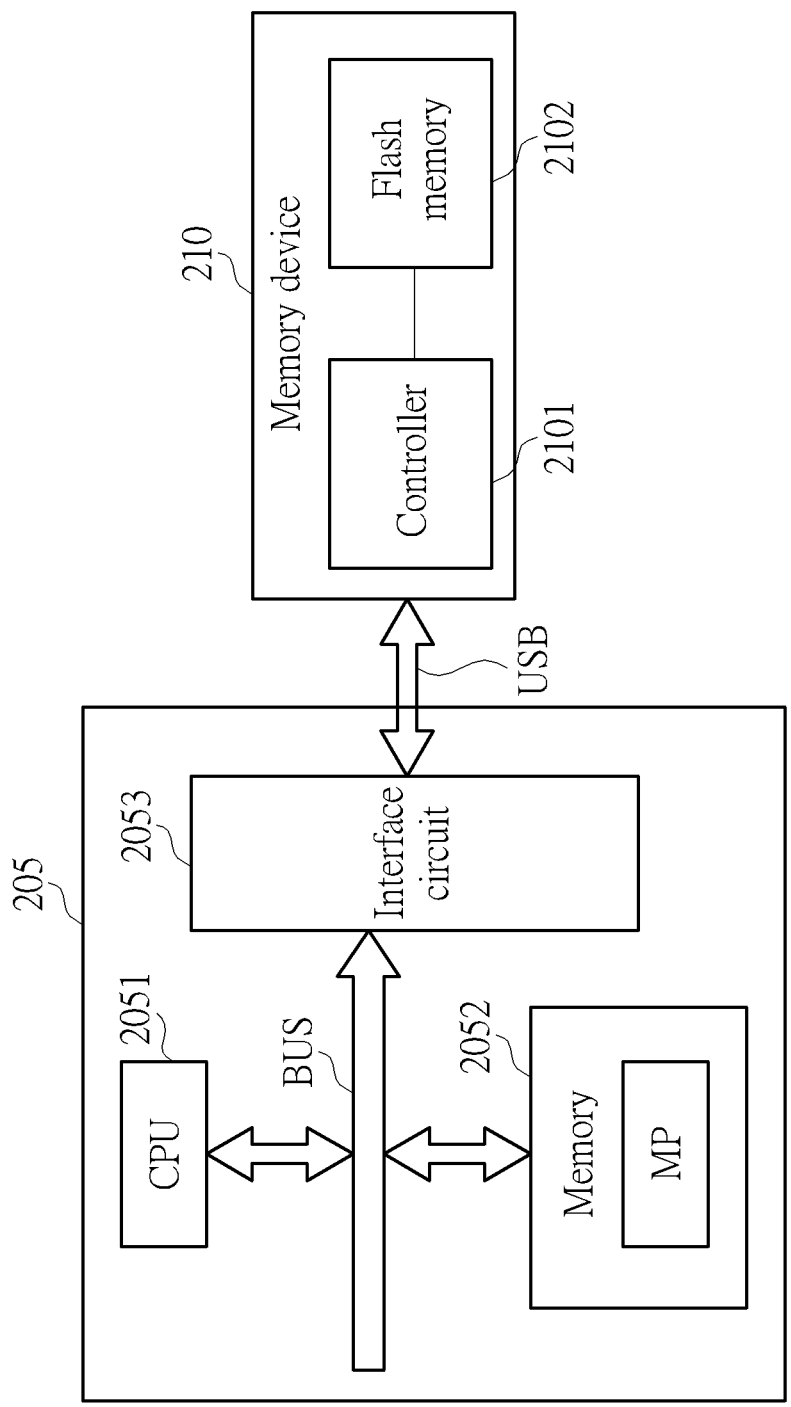
FIG. 2 is a diagram of an electronic device for performing a flash memory initialization operation upon a memory device according to an embodiment of the invention.

FIG. 2 is a diagram of an electronic device 205 for performing a flash memory initialization operation upon a memory device 210 according to an embodiment of the invention. The electronic device 205 for example is one of the flash memory initialization devices PC_1~PC_N of flash memory manufacturer 105, and it comprises a CPU 2051, a memory 2052, and an interface circuit 2053 wherein the bus is connected between the CPU 2051, memory 2052, and interface circuit 2053 to transfer data/signals/commands. The memory 2052 for example is a random access memory to store the mass production software tool MP. The memory device 210 for example is a thumb drive, a pen drive, a memory card such as SD card, a stick, a disk, an SSD (solid state drive) which can electrically connect to the electronic device 205 via the USB interface; however, this is not intended to be a limitation. The memory device 210 for example is a USB flash device (UFD) and comprises the flash memory controller 2101 and the flash memory 2102.

Figure 3:
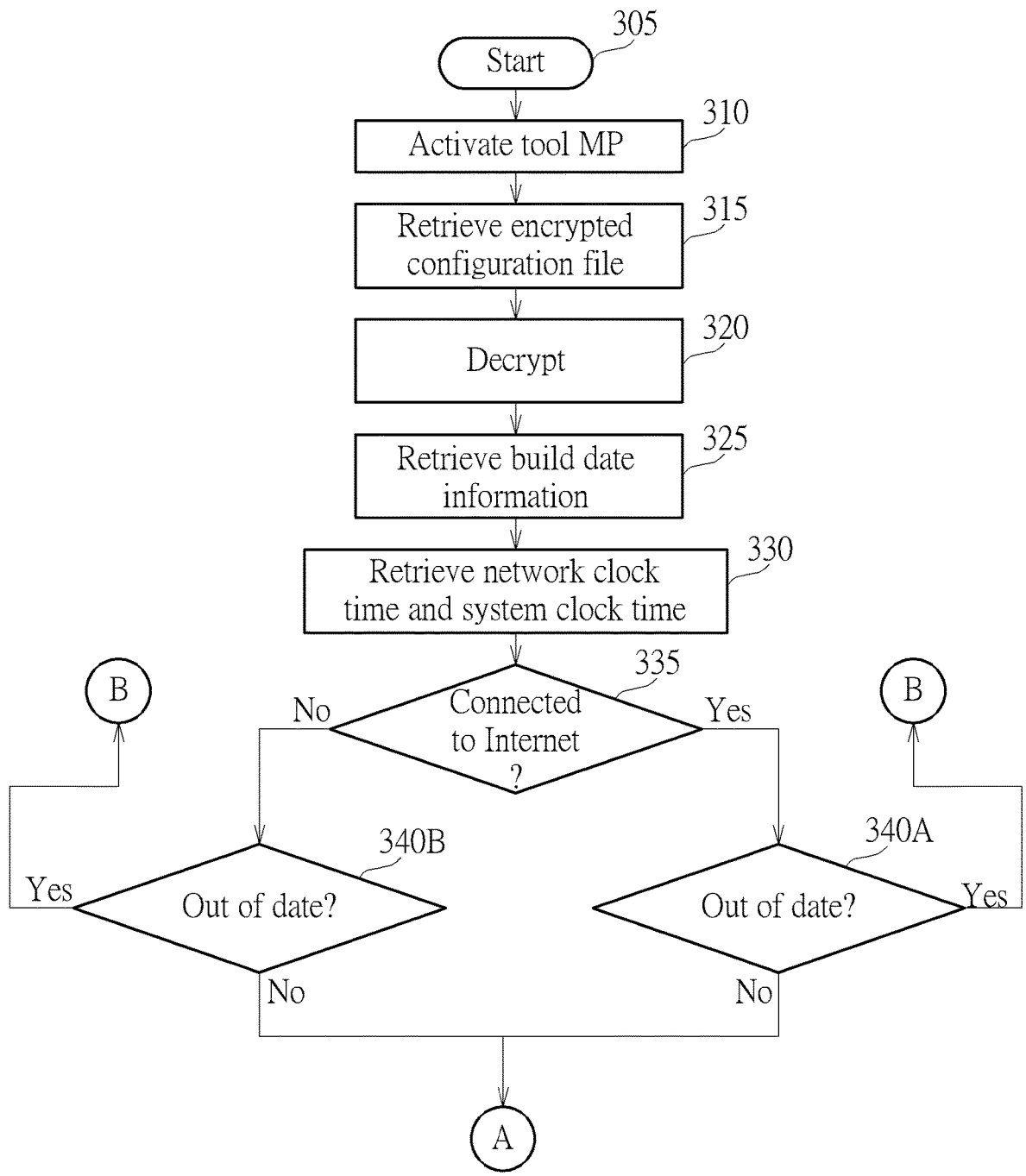
FIG. 3 is a diagram of a first part of a flowchart of a method/process executed by the mass production software tool MP to verify whether an electronic device is a valid flash memory initialization device so as to decide whether to initialize a memory device including a flash memory controller and a flash memory according to the embodiment of FIG. 2.
Figure 4:
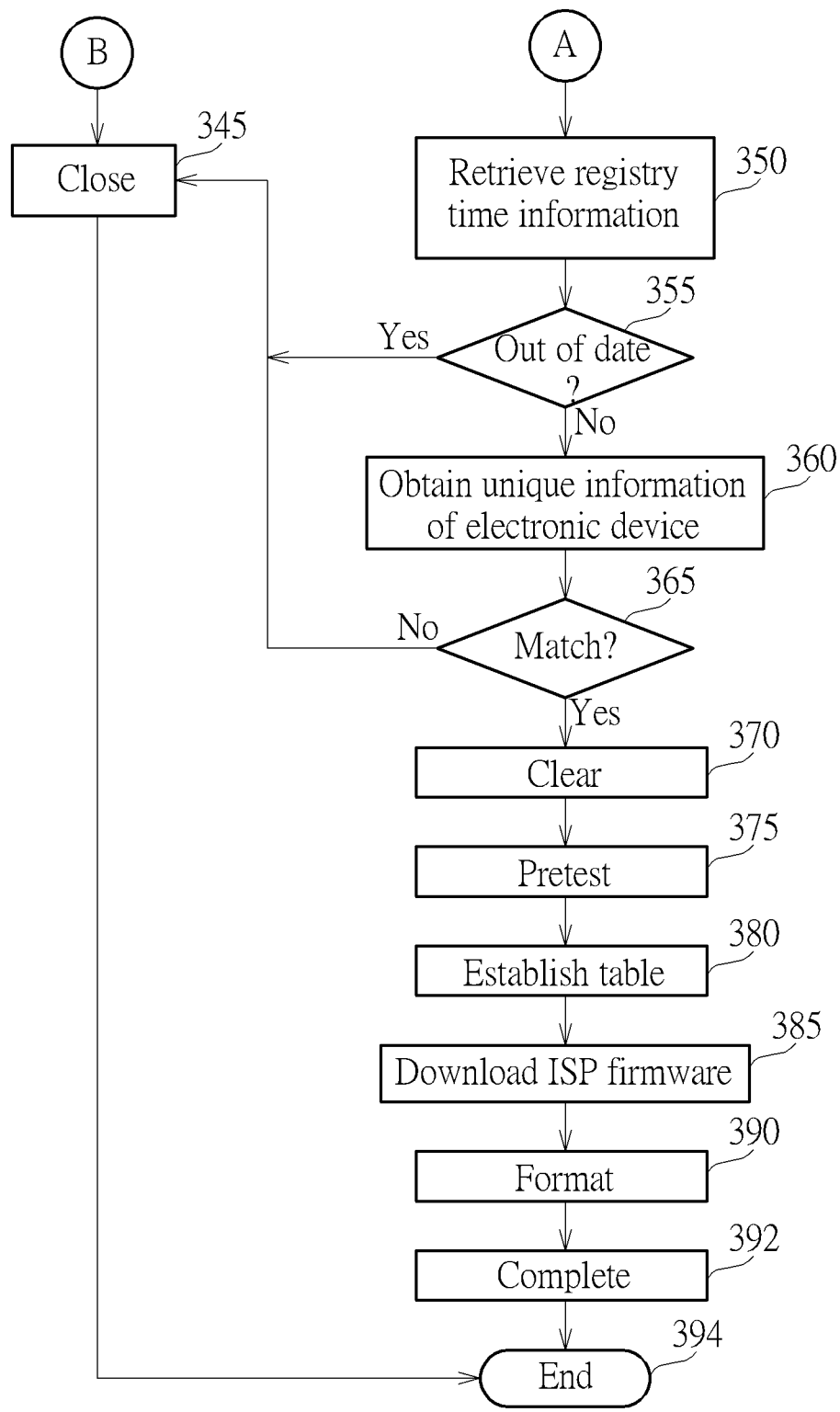
FIG. 4 is a diagram of a second part of a flowchart of a method/process executed by the mass production software tool MP to verify whether an electronic device is a valid flash memory initialization device so as to decide whether to initialize a memory device including a flash memory controller and a flash memory according to the embodiment of FIG. 2.

FIG. 3 and FIG. 4 show a flowchart of a method/process executed by the mass production software tool MP to verify whether an electronic device is a valid flash memory initialization device so as to decide whether to initialize a memory device including a flash memory controller and a flash memory according to the embodiment of FIG. 2. The detailed description of steps is described in the following Step 305: Start;

Step 310: A user such as an operator of the manufacturer manually activates or starts the mass production software tool MP to run the mass production software tool MP on the CPU 2051 of electronic device 205;

Step 315: the mass production software tool MP retrieves or loads its encrypted configuration file;

Step 320: the mass production software tool MP decrypts the encrypted configuration file to generate a temporarily decrypted configuration file;

Step 325: the mass production software tool MP retrieves and loads build date information from the temporarily decrypted configuration file;

Step 330: the mass production software tool MP retrieves or obtains a network clock time from the Internet and a system clock time of the electronic device 205;

Step 335: the mass production software tool MP determines whether the electronic device 205 is connected to the Internet; if the electronic device 205 is connected to the Internet, the flow proceeds to Step 340A, otherwise, the flow proceeds to Step 340B;

Step 340A: the mass production software tool MP compares the build date information with the network clock time to decide whether the build date information is out of date; if the build date information is out of date, the flow proceeds to Step 345, otherwise, the flow proceeds to Step 350;

Step 340B: the mass production software tool MP compares the build date information with the system clock time to decide whether the build date information is out of date; if the build date information is out of date, the flow proceeds to Step 345, otherwise, the flow proceeds to Step 350;

Step 345: Close the mass production software tool MP, i.e. not executing the mass production software tool MP;

Step 350: the mass production software tool MP retrieves registry time information recorded in the electronic device 205; the registry time information for example is stored in the memory 2052;

Step 355: the mass production software tool MP compares the build date information with the registry time information to decide whether the build date information is out of date; if the build date information is out of date, the flow proceeds to Step 345, otherwise, the flow proceeds to Step 360;

Step 360: the mass production software tool MP obtains corresponding unique information of such electronic device 205;

Step 365: the mass production software tool MP compares the corresponding unique information of electronic device 205 with information of the decrypted/decoded configuration file to decide whether the corresponding unique information of electronic device 205 exists in the decrypted/decoded configuration file; if yes, the flow proceeds to Step 370, otherwise, the flow proceeds to Step 345;

Step 370: clear system blocks of the flash memory 2102;

Step 375: perform pretest upon all blocks of the flash memory 2102;

Step 380: establish information tables;

Step 385: download ISP firmware from the electronic device 205 to the flash memory 2102 via the USB interface;

Step 390: perform format operation upon data blocks of the flash memory 2102;

Step 392: Complete the execution of the mass production software tool MP and save/record a total usage time at the registry time information; and Step 394: End.

For example, the encrypted configuration file of the mass production software tool MP is implemented by using the INI file format which is an informal standard for configuration files for some computing platforms or software programs. The encrypted configuration file is not easily cracked by other persons or by a flash memory manufacturer. Thus, the build date information and information of the encrypted/encoded configuration file is not easily modified.

After the mass production software tool MP is manually activated by the user (Step 310) to run the mass production software tool MP on the CPU 2051, the mass production software tool MP is arranged to load its encrypted configuration file (Step 315) and then decrypts such file to generate the temporarily decrypted configuration file (Step 320). Form the temporarily decrypted configuration file, the mass production software tool MP can obtain corresponding unique information of one or more valid/authorized electronic devices PC_1~PC_N of the manufacturer 105 and corresponding build date information associated with the unique information. Corresponding unique information of each valid/authorized electronic device for example comprises at least one of central processing unit identification (CPU ID), MAC address, and a hard disk serial number (but not limited).

The mass production software tool MP in Step 325 loads the build date information of all valid/authorized electronic devices and in Step 330 tries to obtain a network clock time from the Internet and a system clock time of the electronic device 205. Then in Step 335 the mass production software tool MP determines whether the electronic device 205 can be connected to the Internet.

The mass production software tool MP in Step 340A determines whether the authorization for the manufacturer 105 is out of date or not by comparing the build date information with the network clock time from the internet to decide whether the build date information is out of date. If the build date information is out of date, the mass production software tool MP decides that the authorization for the electronic device 205 is out of date. In practice, for example, the mass production software tool MP decides whether the electronic device 205 is connected to the Internet, and then compares the build date information with a date of the network clock time to decide whether an interval between the build date information and the network clock time is longer than an authorized time interval such as three months if the electronic device is currently connected to Internet. If such time interval is longer than the authorized time interval, the mass production software tool MP will finish and will not execute the initialization of the flash memory device 210. Instead, if the time interval is shorter than the authorized time interval, the mass production software tool MP is arranged to execute other verification steps.

Similarly, the mass production software tool MP in Step 340B determines whether the authorization for the manufacturer 105 is out of date or not by comparing the build date information with the system clock time of electronic device 205 itself to decide whether the build date information is out of date. If the build date information is out of date, the mass production software tool MP decides that the authorization for the electronic device 205 is out of date. In practice, for example, the mass production software tool MP decides whether the electronic device 205 is connected to the Internet, and then compares the build date information with a date of the system clock time to decide whether an interval between the build date information and the system clock time is longer than an authorized time interval such as three months if the electronic device 205 cannot be connected to Internet. If such time interval is longer than the authorized time interval, the mass production software tool MP will finish and will not execute the initialization of the flash memory device 210. Instead, if the time interval is shorter than the authorized time interval, the mass production software tool MP is arranged to execute other verification steps.

The mass production software tool MP in Step 350 is arranged to retrieve the registry information from the electronic device 205 so as to obtain registry date information which is arranged to record or mark the total usage time of the mass production software tool MP executed by of such electronic device 205 if the electronic device 205 has been authorized. For example, the registry date information may record the total hours or total minutes which have been consumed by the execution of the mass production software tool MP on the electronic device 205 if the electronic device 205 has been authorized. In practice, before the mass production software tool MP is executed on the electronic device 205 for the first time, content of the registry date information is empty. For the first time execution of the tool MP, the mass production software tool MP after being activated may record a first time and record a second time when being closed/deactivated (or the execution of tool MP is completed), and the tool MP calculates how many hours/minutes consumed by the tool MP for the first time execution on the electronic device based on the first time and second time to derive and obtain a first value in hours. Then the tool MP updates the registry date information as the calculated first value.

For the second time execution, the mass production software tool MP after being activated also records a first time and records a second time when being closed/deactivated (or the execution of tool MP is completed), and the tool MP calculates how many hours/minutes consumed by the tool MP for the second time execution on the electronic device 205 based on the first time and second time to derive and obtain a second value in hours. Then the tool MP updates the registry date information as the calculated second value plus the first value. The registry date information is accumulated.

The mass production software tool MP in Step 355 is arranged to determine whether the value currently recorded at the registry date information is greater than a total authorization usage time value (in hours/minutes) corresponding to the build date information so as to further determine whether the build date information is out of date or not. If the value currently recorded at the registry date information is greater than the total authorization usage time value such as a value of 150 (i.e. 150 hours, but not limited), the mass production software tool MP is arranged to close or deactivate itself execution. If the value currently recorded at the registry date information is smaller than the total authorization usage time value, the mass production software tool MP then is arranged to execute other verification steps.

The mass production software tool MP in Step 360 is arranged to obtain at least one of CPU ID, MAC address, hard disk serial number, and so on of the electronic device 205 to calculate or derive corresponding unique information of electronic device 205.

Then in Step 365 the mass production software tool MP determines whether any unique information recorded in the decrypted configuration file matches to the corresponding unique information of such electronic device 205. In practice, unique information recorded in the encrypted configuration file generated by the flash memory controller provider is a sequence of encoded/encrypted data having 16 Bytes (but not limited), and the corresponding unique information in the decrypted configuration file may comprise information of at least one of central processing unit identification (CPU ID), MAC address, a hard disk serial number, and so on for one valid/authorized device. The mass production software tool MP is arranged to retrieve the same type information of the electronic device 205. For example, the mass production software tool MP retrieves the CPU ID, MAC address, and a hard disk serial number of the electronic device 205. Then the mass production software tool MP compares the two sets of information to determine if the two sets of information are identical so as to decide whether the electronic device 205 is such valid/authorized device.

If matched, the mass production software tool MP is arranged to start to execute the flash memory initialization, otherwise, the mass production software tool MP is arranged to decide that the flash memory initialization fails and close or deactivate its execution.

For the flash memory execution, the mass production software tool MP in Step 370 is arranged to send a command from the CPU 2051 to the flash memory controller 2101 via the bus, interface circuit 2053, and USB interface to control the flash memory controller 2101 to clear all system blocks of the flash memory 2102. For example, the controller 2101 clears the mapping of logical block addressing (LBA).

Then, the mass production software tool MP in Step 375 controls the controller 2101 to perform a pretest operation to scan all blocks in the flash memory 2102. For example, for each block, the controller 2101 is arranged to scan the each block by writing data into the each block, then reading data from the each block, and then comparing the read data and written data so as to determine if the each block can be correctly accessed so as to decide whether the each block is a good block or a bad block. The controller 2101 during the pretest operation is arranged to record a good/bad block result of the each block in the flash memory 2102.

The mass production software tool MP in Step 380 controls the controller 2101 to establish corresponding table(s) comprising a good/bad block table, a page size table, a block number table, and/or other tables (but not limited). For example, the controller 2101 is arranged to collect all the good/bad block results recorded in the flash memory 2102 to generate and establish the good/bad block table that is then stored in the flash memory 2102.

Then, after the corresponding tables have been established and recorded in the flash memory 2102, the mass production software tool MP in Step 385 transmits data of an ISP (In-System Programming) firmware via the USB interface to the controller 2101 which is arranged to transfer the ISP firmware into the flash memory 2102. The ISP firmware is used by the controller 2101 to access and manage the flash memory 2102. Then, the controller 2101 is restarted to identify, read, and use the ISP firmware stored or recorded in the flash memory 2102.

The mass production software tool MP in Step 390 controls the controller 2101 to perform a format operation up on data blocks of the flash memory 2102 by sending a format command to the controller 2101 wherein the format command for example is a format command in Windows. After the format operation is completed, the flash memory initialization is successfully completed (Step 392), and the flow of flash memory initialization is ended.

In other embodiments, the method/process of the invention can verify whether an electronic device is a valid/authorized device by merely comparing the device unique information without comparing build date information with specific time information. The modification also falls within the scope of the invention. Additionally, in other embodiments, the order of the step of comparing the device's unique information can be exchanged with that of the step of comparing the build date information with the specific time information.

In addition, based on the above description, it should be appreciated that various embodiments of the invention include a method, electronic device/apparatus, and computer-readable medium for formula-based document retention. The above specification, examples and data provide a complete description of the manufacture and use of the composition of the invention. Many embodiments of the invention can be made without departing from the spirit and scope of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for using an electronic device to activate a mass production software tool to initialize a memory device including a flash memory controller and a flash memory, the memory device is to be coupled to the electronic device via a USB interface, and the method comprises:
   using the mass production software tool to retrieve an encrypted configuration file included by the mass production software tool;
   decrypting the encrypted configuration file to generate a temporarily decrypted configuration file which records unique information of multiple valid/authorized flash memory initialization devices, the encrypted configuration file being a sequence of encrypted data having 16 Bytes;
   retrieving build date information from the temporarily decrypted configuration file;
   comparing time information included within the build date information with specific time information to determine whether the build date information is out of date;
   comparing unique information of the electronic device with the unique information of the multiple valid/authorized flash memory initialization devices recorded in the temporarily decrypted configuration file to determine whether the electronic device is a valid/authorized flash memory initialization device in the multiple valid/authorized flash memory initialization devices when the build date information is not out of date, wherein the unique information of the electronic device comprises central processing unit identification (CPU ID), MAC address, and a hard disk serial number of the electronic device; and
   performing a flash memory initialization operation upon the flash memory when the electronic device is valid/authorized, the flash memory initialization operation comprising using the mass production software tool to control the flash memory controller via the USB interface to:
   clear at least one system block of the flash memory;
   perform a pretest operation upon to scan all blocks of the flash memory;
   establish at least one information table based on a result of the pretest operation;
   download a firmware included by the mass production software tool from the electronic device to the flash memory via the USB interface and the flash memory controller; and perform a format operation upon data blocks of the flash memory.

2. The method of claim 1, wherein the specific time information comprises at least one of a network clock time from Internet, a system clock time of the electronic device, and registry time information recorded in the electronic device.

3. A method for using an electronic device to activate a mass production software tool to initialize a memory device including a flash memory controller and a flash memory, the memory device is to be coupled to the electronic device via a USB interface, and the method comprises:
  using the mass production software tool to retrieve an encrypted configuration file included by the mass production software tool;
  decrypting the encrypted configuration file to generate a temporarily decrypted configuration file which records unique information of multiple valid/authorized flash memory initialization devices, the encrypted configuration file being a sequence of encrypted data having 16 Bytes;
  comparing unique information of the electronic device with the unique information of the multiple valid/authorized flash memory initialization devices recorded in the temporarily decrypted configuration file to determine whether the electronic device is a valid/authorized flash memory initialization device in the multiple valid/authorized flash memory initialization devices, wherein the unique information of the electronic device comprises central processing unit identification (CPU ID), MAC address, and a hard disk serial number of the electronic device; and
  performing a flash memory initialization operation upon the flash memory when the electronic device is valid/authorized, the flash memory initialization operation comprising using the mass production software tool to control the flash memory controller via the USB interface to:
    clear at least one system block of the flash memory;
    perform a pretest operation upon to scan all blocks of the flash memory;
    establish at least one information table based on a result of the pretest operation;
    download a firmware included by the mass production software tool from the electronic device to the flash memory via the USB interface and the flash memory controller; and
    perform a format operation upon data blocks of the flash memory.

4. An electronic device for activate a mass production software tool to initialize a memory device including a flash memory controller and a flash memory, the memory device is to be coupled to the electronic device via a USB interface, and the electronic device comprises:
  a memory, for storing the mass production software tool; and
  a processing unit, coupled to the memory, for:
    using the mass production software tool to retrieve an encrypted configuration file included by the mass production software tool;
    decrypting the encrypted configuration file to generate a temporarily decrypted configuration file which records unique information of multiple valid/authorized flash memory initialization devices, the encrypted configuration file being a sequence of encrypted data having 16 Bytes;
    comparing unique information of the electronic device with the unique information of the multiple valid/authorized flash memory initialization devices recorded in the temporarily decrypted configuration file to determine whether the electronic device is a valid/authorized flash memory initialization device in the multiple valid/authorized flash memory initialization devices when the build date information is not out of date, wherein the unique information of the electronic device comprises central processing unit identification (CPU ID), MAC address, and a hard disk serial number of the electronic device; and
    performing a flash memory initialization operation upon the flash memory when the electronic device is valid/authorized, the flash memory initialization operation comprising using the mass production software tool to control the flash memory controller via the USB interface to:
      clear at least one system block of the flash memory;
      perform a pretest operation upon to scan all blocks of the flash memory;
      establish at least one information table based on a result of the pretest operation;
      download a firmware included by the mass production software tool from the electronic device to the flash memory via the USB interface and the flash memory controller; and
      perform a format operation upon data blocks of the flash memory.

5. An electronic device for activate a mass production software tool to initialize a memory device including a flash memory controller and a flash memory, the memory device is to be coupled to the electronic device via a USB interface, and the electronic device comprises:
  a memory, for storing the mass production software tool; and
  a processing unit, coupled to the memory, for:
    using the mass production software tool to retrieve an encrypted configuration file included by the mass production software tool;
    decrypting the encrypted configuration file to generate a temporarily decrypted configuration file which records unique information of multiple valid/authorized flash memory initialization devices, the encrypted configuration file being a sequence of encrypted data having 16 Bytes;
    retrieving build date information from the temporarily decrypted configuration file;
    comparing time information included within the build date information with specific time information to determine whether the build date information is out of date;
    comparing unique information of the electronic device with the unique information of the multiple valid/authorized flash memory initialization devices recorded in the temporarily decrypted configuration file to determine whether the electronic device is a valid/authorized flash memory initialization device in the multiple valid/authorized flash memory initialization devices when the build date information is not out of date, wherein the unique information of the electronic device comprises central processing unit identification (CPU ID), MAC address, and a hard disk serial number of the electronic device; and
    performing a flash memory initialization operation upon the flash memory when the electronic device is valid/authorized, the flash memory initialization operation comprising using the mass production software tool to control the flash memory controller via the USB interface to:

clear at least one system block of the flash memory;

perform a pretest operation upon to scan all blocks of the flash memory;

establish at least one information table based on a result of the pretest operation;

download a firmware included by the mass production software tool from the electronic device to the flash memory via the USB interface and the flash memory controller; and perform a format operation upon data blocks of the flash memory.

6. The electronic device of claim 5, wherein the specific time information comprises at least one of a network clock time from Internet, a system clock time of the electronic device, and registry time information recorded in the electronic device.

* * * * *